No. 767,041. PATENTED AUG. 9, 1904.
G. W. CURFMAN.
CAR WHEEL.
APPLICATION FILED JUNE 13, 1903.
NO MODEL.
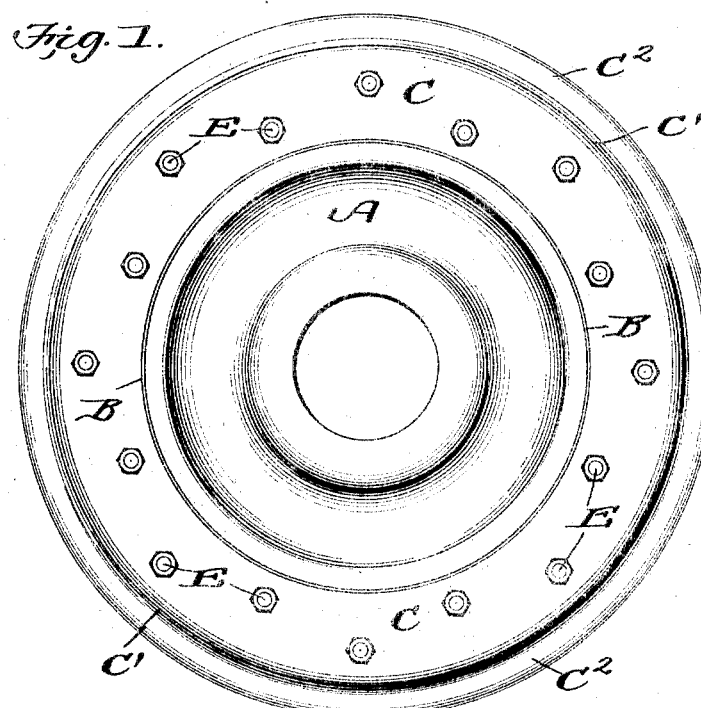
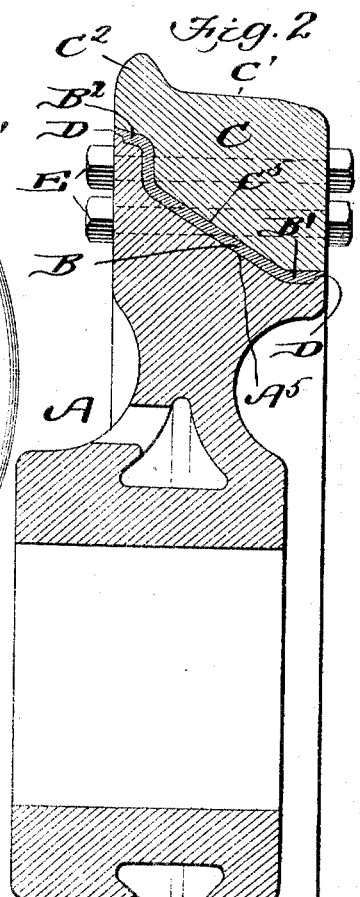
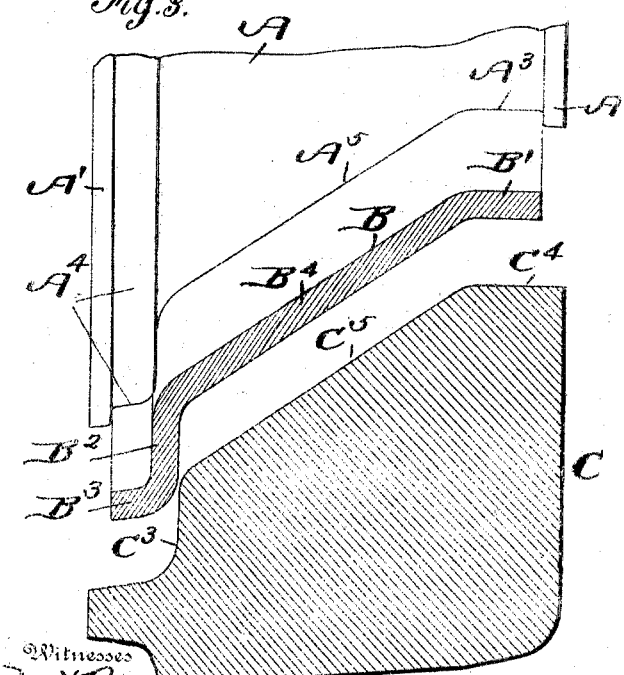
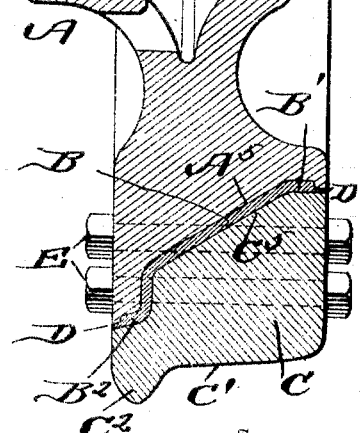
Inventor
G. W. Curfman
Witnesses
By Edward Brock
Attorney No. 767,041. Patented August 9, 1904.

UNITED STATES PATENT OFFICE.

GEORGE W. CURFMAN, OF CLEVELAND, OHIO, ASSIGNOR OF ONE-HALF TO JOHN W. CORTS, OF CLEVELAND, OHIO.

CAR-WHEEL.

SPECIFICATION forming part of Letters Patent No. 767,041, dated August 9, 1904.

Application filed June 13, 1903. Serial No. 161,366. (No model.)

*To all whom it may concern:*

Be it known that I, GEORGE W. CURFMAN, a citizen of the United States, residing at Cleveland, in the county of Cuyahoga and State of Ohio, have invented a new and useful Car-Wheel, of which the following is a specification.

My invention is an improvement in car-wheels of that special type known as "paper" wheels, my object being the production of a wheel of this character which will run noiselessly; and a still further object is to produce a wheel in which the tire portion can be readily removed when worn and replaced by a new tire.

My invention consists of the peculiar manner in which the paper, leather, or asbestos is arranged between the tire and the body of the wheel, and particularly in the shaping of the inner face of the tire and the periphery of the body portion, whereby pressure is exerted inwardly and outwardly upon the paper packing—inwardly with reference to the body and outwardly with reference to the sides of the wheel.

My invention also consists of the novel features of construction and combination of parts described hereinafter, particularly pointed out in the claims, and shown in the accompanying drawings, in which—

Figure 1 is a side elevation of the wheel. Fig. 2 is a section taken diametrically through the wheel; and Fig. 3 is a detail view, partly in section, showing portions of the tire, paper packing, and body, the parts mentioned being detached.

In the construction of my improved wheel I use the central gray-iron body $A$, which may be of the usual construction so far as the body portion of the wheel is concerned. This wheel is formed with an inner and an outer peripheral flange $A'$ and $A^2$, lying in different horizontal planes, the diameter of the circumference of the outer flange $A^2$ being approximately three-fourths of that of the inner flange. Commencing with the outer flange, the body is formed adjacent said flange with a narrow straight tread $A^3$ at right angles to the flange. Within the flange $A'$ is a thicker but diametrically lesser flange, forming a rounded shoulder $A^4$. Extending from the inner end of the tread $A^3$ to the base of the shoulder $A^4$ is an inclined central tread $A^5$ or face sloping from the tread $A^3$ substantially at an angle of about thirty-two and a half degrees.

The paper or cushioning material is a ring $B$, having at its outer edge the straight portion $B'$ parallel to the plane of the axis of the ring, the ring having adjacent its inner edge an outwardly-turned flange $B^2$ at a right angle to the axis of the ring, the edges of the flange being turned inwardly with reference to the car-truck, the central body portion of the ring $B^4$ forming a truncated cone and connecting the parts $B'$ and $B^2$. The tire $C$ is formed with the usual tread $C'$ and flange $C^2$. Its inner surface is shaped so as to fit snugly over the cushion and comprises the inner annular curved recessed portion $C^3$, the straight outer portion $C^4$, and the inclined central portion $C^5$. The width of the portion $C^4$ is equal to the width of the parts $A^3$ and $A^4$ combined of the body of the wheel.

In assembling the wheel the part $B'$ of the cushion rests against the tread $A^3$ of the body portion, the part $B^3$ bears against the shoulder $A^4$, the part $B^3$ bearing on the flange $A'$, and the central portion $B^4$ resting against the sloping portion $A^5$ of the body. When the tire has been forced in position, as shown in Fig. 2, the pressure on the cushion will force a thin layer of it between the flanges $A'$ $A^2$ and the tire, as shown at $D$.

It will be especially noted that by this construction a continuous unbroken cushion extends from the outer to the inner side of the wheel. The bolts $E$ are alternately offset, being arranged in two series, and by constructing the wheel as described the bolts of one series will pass through the thickest portion of the tire and through the shoulder $A^4$, while the bolts of the other series will pass through a portion of the main body of the wheel, making a stronger construction than where the bolts pass through flanges only.

Having thus fully described my invention, what I claim as new, and desire to secure by Letters Patent, is—

1. A car-wheel having a body portion having inner and outer peripheral flanges the diameter of the inner flange being greater than that of the outer flange, a rounded shoulder formed within the inner flange and an unbroken, straight, inclined face connecting the narrow tread with the base of the shoulder, a tire having peripheral tread and flange portions and having its inner face formed with an annular curved recess adapted to receive the shoulder and inner flange of the body portion, a straight portion parallel with the wheel-axis and adjacent the outer face of the wheel, and a central inclined portion, and an unbroken cushion arranged between the body portion of the wheel and the tire and spacing the inner and outer flanges of the body portion from the tire.

2. A car-wheel having a central body portion, the periphery of said portion being inclined intermediate the faces of the wheel with reference to the car-axle, the said body portion being flanged at each side, a tire portion comprising a tread-surface and a flange portion, and having an inner face adapted to bear on the flanges of the periphery, and a paper cushion arranged on the periphery of the body portion adapted when under pressure of the tire to overlap the flanges of the body portion and hold the tire out of contact with said flanges and with the intermediate portion of the periphery of the body of the wheel.

GEORGE W. CURFMAN.

Witnesses:
NATHAN LEEDS,
L. M. SCHARF.